United States Patent Office

2,900,243
Patented Aug. 18, 1959

2,900,243

HERBICIDES 1596(A)

Norman J. Lewis, Kirkwood, Mo., assignor to Monsanto Chemical Company, St. Louis, Mo., a corporation of Delaware No Drawing. Application December 28, 1955
Serial No. 555,793

6 Claims. (Cl. 71—2.5)

This invention relates to herbicidal compositions and methods for their use. More particularly, this invention relates to a new active chemical compound of general utility, which is a near homologue to compounds of little or no activity.

It is the primary purpose of this invention to provide a new and useful general herbicide and methods for its use. A further purpose of the invention is to provide a class of new chemical compounds and methods for their preparation. Still further purposes of the invention will be apparent from the following disclosure.

In accordance with this invention it has been discovered that the N-(p-halophenyl)-1,2-cyclohexanedicarboximides having the following structure

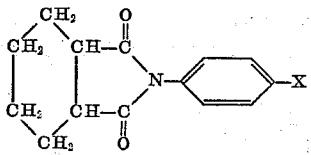

wherein X is a halogen atom, have unusual and valuable herbicidal activity.

This new class of compounds is prepared by the reaction of hexahydrophthalic anhydride with p-halo aniline. This reaction is preferably conducted in a solvent medium, for example an aromatic hydrocarbon, such as benzene or toluene, or an alcohol, such as n-butanol or octanol, the solvent being chosen so as to provide temperature control by operation under reflux conditions. The reaction mass after heating for a substantial period of time at reflux is dissolved in caustic alkali. Upon the addition of hydrochloric acid, the N-(p-halophenyl)cyclohexane-1,2-dicarboximides are recovered from the reaction mass by fractional crystallization.

Further details of the preparation and use of the compounds are set forth in the following examples.

Example 1

A 200 ml. flask is charged with 30.8 g. of hexahydrophthalic anhydride and 50 ml. of butanol. The mixture is heated until a clear solution was formed. After filtering the reaction mixture is heated at the reflux temperature and a solution of 25.5 g. of p-chloroaniline in 30 ml. of butanol gradually added. Heating at reflux continues for one hour after reagents are combined. After cooling the reaction mass 300 ml. of 20 percent caustic is added to dissolve the mass. After filtering the solution is acidified with 10 percent hydrochloric acid. An oil separates and solidifies upon cooling. The product is washed with water, dried and recrystallized from 200 ml. of butyl alcohol. The product is identified as N-(p-chlorophenyl)cyclohexane-1,2-dicarboximide.

Example 2

The procedure of Example 1 is repeated except that p-bromoaniline is used in place of p-chloroaniline. The product separated from the reaction mixture is N-(p-bromophenyl)cyclohexane-1,2-dicarboximides.

Example 3

A one liter reaction flask is charged with 30.8 g. of hexahydrophthalic anhydride dissolved in 20 ml. of dry benzene. While stirring vigorously a solution of 25.5 g. of p-chloroaniline dissolved in 200 ml. of benzene is gradually added thereto. During the reaction the temperature is maintained at 50° C. and after all of the reactants have been combined the temperature is maintained and the stirring continued for one hour. The reaction mixture is cooled and a 94% yield of product is recovered having a melting point of 180 to 181° C., the compound being identified as 2-(p-chlorophenylcarbamyl)-cyclohexane carboxylic acid.

Example 4

A flask is charged with 21.1 g. of 2-(p-chlorophenylcarbamyl)-cyclohexane carboxylic acid which is heated at 200 to 210° C. with stirring for four hours. During the reaction the flask is subjected to a slight vacuum. A quantitative yield of N-(p-chlorophenyl)-1,2-cyclohexanedicarboximide is recovered having a melting point of 157 to 159° C.

The relative value of the herbicidal compounds was determined by planting in greenhouse flats seeds of seven different plants each representing a principal botanical type. The flats were treated with the herbicide of the rate equivalent to 5 lbs. per acre. In the following table of herbicidal evaluation data, these plants are represented by letters as follows:

A—Broome grass
B—Rye
C—Buckwheat
D—Radish
E—Clover
F—Sugar beet
G—Cucumber

The relative value of each compound with respect to its herbicidal effect on the various plants is indicated by a number as follows:

0—No phytotoxicity
1—Slight phytotoxicity
2—Moderate phytotoxicity
3—Severe phytotoxicity The following table of observed data demonstrates phytotoxicity of the specified compound of the new class.

| | A | B | C | D | E | F | G |
|---|---|---|---|---|---|---|---|
| N-(p-chlorophenyl)-1, 2-cyclohexanedicarboximide | 2 | 2 | 2 | 2 | 2 | 3 | 3 |

Using this procedure N-(o-chlorophenyl)-1,2-cyclohexanedicarboximide and N-(phenyl)-1,2-cyclohexanedicarboximide were examined to determine their herbicidal activity. They were found to be without activity at application rates of 25 pounds per acre. Thus with respect to preemergence herbicidal activity the cyclohexane dicarboximide containing p-halo substituted phenyl group on the imide nitrogen atom is of substantial activity, whereas the homolog without a halogen atom on the benzene ring are completely ineffective.

Valuable herbicidal effects will be observed by applications of small amounts, for example as low as 1 lb. of active component per acre as well as high concentrations, for example 100 lbs. per acre. For preferred application and herbicidal effect on both the grasses and the dicotyledonous plants, 2 to 15 lbs. per acre is an effective treatment.

An important part of this invention is the formulation so as to permit a uniform predetermined application of herbicide to leaves or soil surfaces so as to produce the desired effect. By the proper selection and proportioning of the various conditioning agents either liquid or solid formulations can be prepared, and so as to adapt the herbicide for achieving the desired result with any conventional device for treating plant or soil surfaces.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free-flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the betonites and the attapulgites; other minerals in natural state, such as talc, pyrophyllite, quartz, diatomaceous earth, fuller's earth, chalk, rock phosphate and sulfur; and the chemically modified minerals, such as the acid washed betonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if it is mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. If the herbicides are soluble, mere dissolution in a suitable solvent will then provide a usable formulation. Often the herbicides are only limitedly soluble in water and therefore aqueous formulations will necessarily be dispersions of the water-insoluble substances in an aqueous medium. The water-insoluble substituted herbicides of this invention may first be dissolved in a suitable organic solvent and the organic solution of the active ingredient then incorporated in water or in any aqueous medium to produce a heterogeneous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either in liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

What is claimed is:

1. The chemical compound having the structure

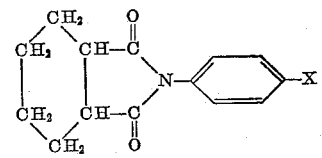

wherein X is a halogen atom.

2. The chemical compound having the structure

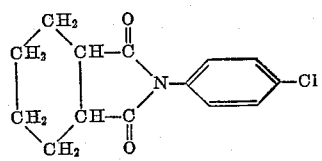

3. The chemical compound having the structure

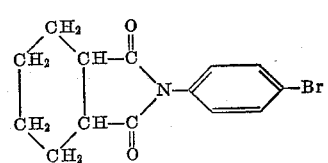

4. A method of minimizing the preemergent germination of seeds and growth of plants thereof in agricultural soil which comprises applying to the soil from 2 to 15 pounds per acre of a compound having the structure:

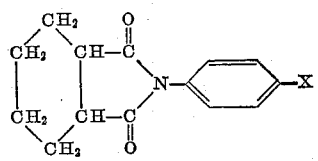

wherein X is a halogen atom.

5. A method of minimizing the preemergent germination of seeds and growth of plants thereof in agricultural soil which comprises applying to the soil from 2 to 15 pounds per acre of a compound having the structure:

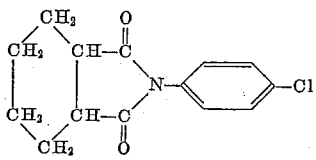

6. A method of minimizing the preemergent germination of seeds and growth of plants thereof in agricultural soil which comprises applying to the soil from 2 to 15 pounds per acre of a compound having the structure:

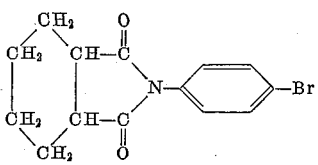

References Cited in the file of this patent

UNITED STATES PATENTS

| | | |
|---|---|---|
| 2,527,322 | Morey | Oct. 24, 1950 |
| 2,556,664 | Smith et al. | June 12, 1951 |

OTHER REFERENCES

Nazarov et al.: C.A., vol. 49, April–May 1955, p. 5329f.